United States Patent [19]
Suzuki

[11] Patent Number: 6,053,229
[45] Date of Patent: Apr. 25, 2000

[54] PNEUMATIC TIRE WITH SPECIFIED BEAD FILLER HEIGHT AND METHOD OF MANUFACTURING THE SAME

[75] Inventor: Kazuya Suzuki, Shirakawa, Japan

[73] Assignee: Sumitomo Rubber Industries, Ltd., Hyogo-ken, Japan

[21] Appl. No.: 09/105,093

[22] Filed: Jun. 26, 1998

[30] Foreign Application Priority Data

Jun. 27, 1997 [JP] Japan ................................. 9-172285

[51] Int. Cl.[7] ..................... B29D 30/20; B29D 30/32; B60C 13/00; B60C 15/06
[52] U.S. Cl. ..................... 152/541; 152/546; 152/555; 156/132; 156/135
[58] Field of Search ..................... 152/541, 546, 152/555, 547, 539; 156/132, 135, 133

[56] References Cited

U.S. PATENT DOCUMENTS 5,361,820  11/1994  Adachi ..................... 152/555
5,526,863  6/1996  Hodges ..................... 152/541
5,620,539  4/1997  Ide ..................... 152/541
5,639,321  6/1997  Sakamoto et al. ..................... 152/546 X

*Primary Examiner*—Adrienne C. Johnstone
*Attorney, Agent, or Firm*—Birch, Stewart, Kolasch & Birch, LLP

[57] ABSTRACT

A pneumatic tire and a method of manufacturing the tire are disclosed, wherein the tire comprises a carcass ply turned up around a bead core in each bead portion, and a rubber bead filler disposed between the turnup portion and main portion of the carcass ply and extending radially outwardly from the bead core beyond the maximum section width point of the tire, the bead filler comprising a radially inner part preferably made of a bead apex rubber tapering radially outwardly from the bead core and a radially outer part preferably made of a strip of hard rubber having a substantially constant thickness and a JIS-A hardness of 75 to 95 degrees, the radially outer end of the bead apex rubber being lower than the radially outer end of a flange of a standard rim.

5 Claims, 7 Drawing Sheets

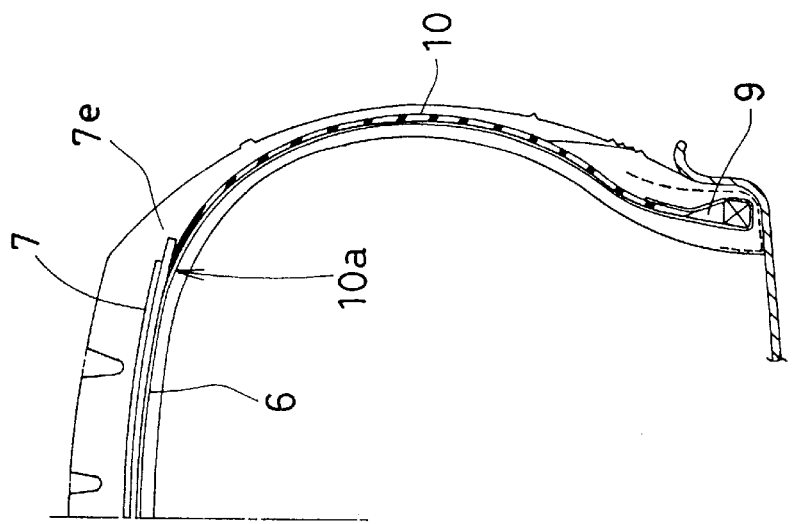
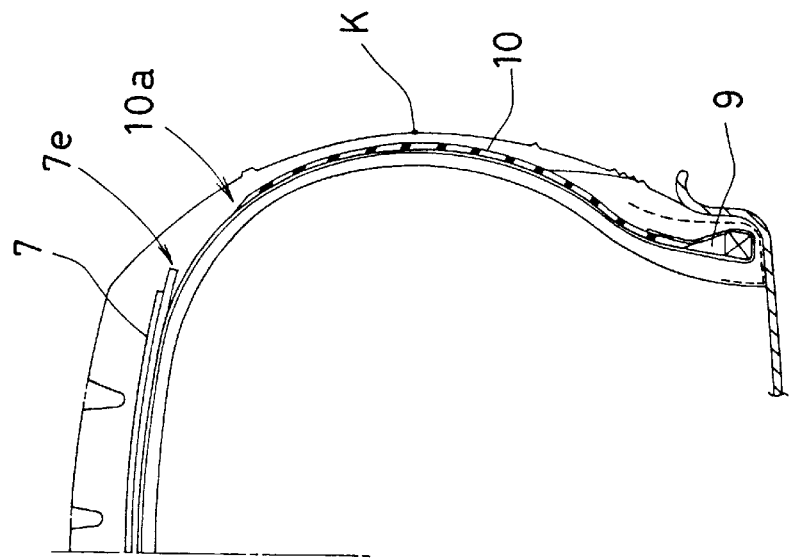

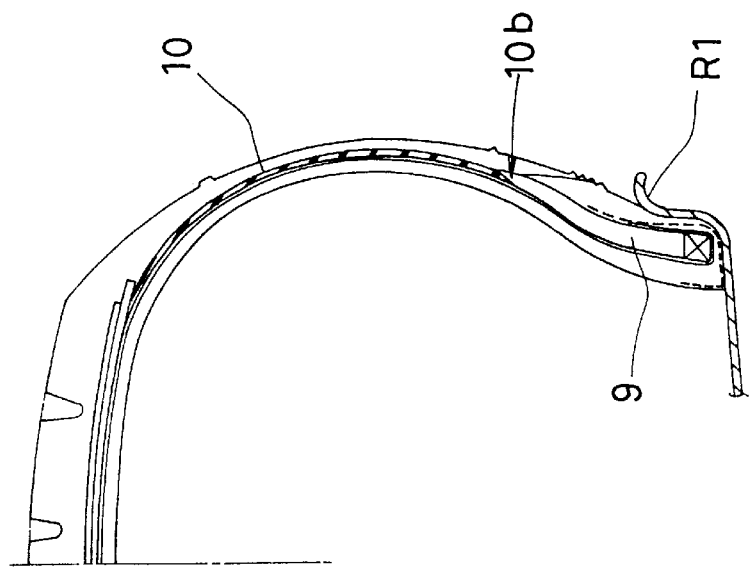
Fig. 6 COMPARATIVE
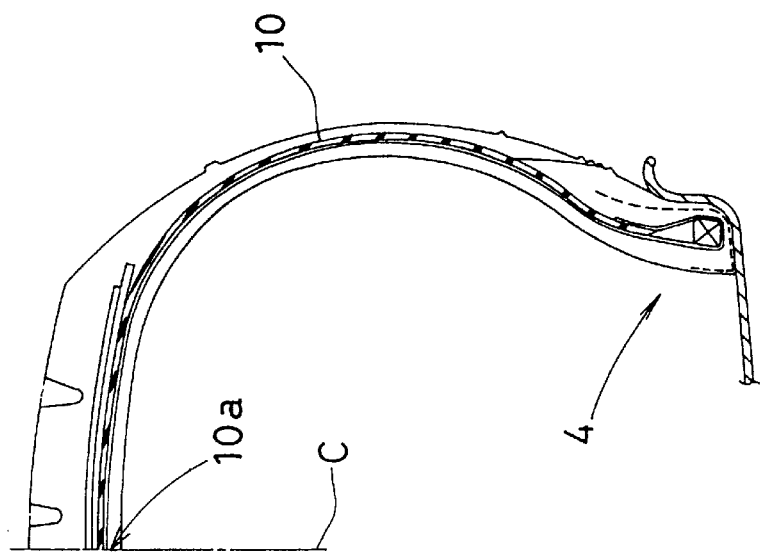
Fig. 5

PNEUMATIC TIRE WITH SPECIFIED BEAD FILLER HEIGHT AND METHOD OF MANUFACTURING THE SAME

BACKGROUND OF THE INVENTION

1. Field of the Invention

The present invention relates to a pneumatic tire and a method of manufacturing the tire, more particularly to an improvement concerning a bead filler being capable of improving the production efficiency without deteriorating the steering stability.

2. Description of the Related Art

In general, in order to reinforce the bead portions (a) and a lower sidewall portion of a pneumatic tire, especially radial tire, a bead filler (d) made of a great mass of hard rubber is disposed between a turnup portion (b2) and main portion (b1) of the carcass (b) as shown in FIG. 9.

Meanwhile, such a tire is usually manufactured by using a tire building drum, and as shown in FIG. 10 the thick bead filler (d) necessitates a moderate bending action onto the carcass (b) wound around the tire building drum not to deform or crack it. Thus, it is difficult to increase the production efficiency.

SUMMARY OF THE INVENTION

It is an object of the present invention to provide a pneumatic tire in which, by employing a bead filler made up of two separate rubber materials connected at a certain height, the production efficiency can be improved without deteriorating the steering stability.

According to the present invention, a pneumatic tire comprises a carcass ply extending between a pair of bead portions and turned up around a bead core in each bead portion to form a pair of turnup portions and a main portion therebetween, and a rubber bead filler disposed between the turnup portion and main portion of the carcass ply in each bead portion, the rubber bead filler continuously extending radially outwardly from the bead core beyond the maximum section width point of the tire, the rubber bead filler comprising a radially inner part tapering radially outwardly from the bead core and a radially outer part having a substantially constant thickness, and the radially outer part having a JIS-A hardness of 75 to 95 degrees.

According to the present invention, a method of manufacturing the pneumatic tire comprises the steps of winding a carcass ply around a cylindrical face of a tire building drum so that the edges of the carcass ply protrude from the edges of the cylindrical face, decreasing the diameter of the protruding portions of the wound carcass ply relatively to the main portion other than protruding portions, setting an annular bead core around each of the protruding portions and a bead apex rubber on the radially outside of the bead core, wherein the bead apex rubber is for forming the radially inner tapering part of the bead filler and the radially outer end thereof is placed at the substantially same radial position of the edge of the cylindrical face or radially inward thereof, winding a strip of hard rubber around the main portion of the carcass ply so as to contact with the bead apex rubber, wherein the strip of hard rubber is for forming the radially outer constant-thickness part of the bead filler, and turning up the protruding portions of the carcass ply around the bead cores.

DESCRIPTION OF THE DRAWINGS

Embodiments of the present invention will now be described in detail in conjunction with the accompanying drawings.

FIGS. 3, 4 and 5 are cross sectional views showing modifications of the bead filler.

FIG. 6 is a cross sectional view of a test tire.

DETAILED DESCRIPTION OF THE INVENTION

Figure 1:
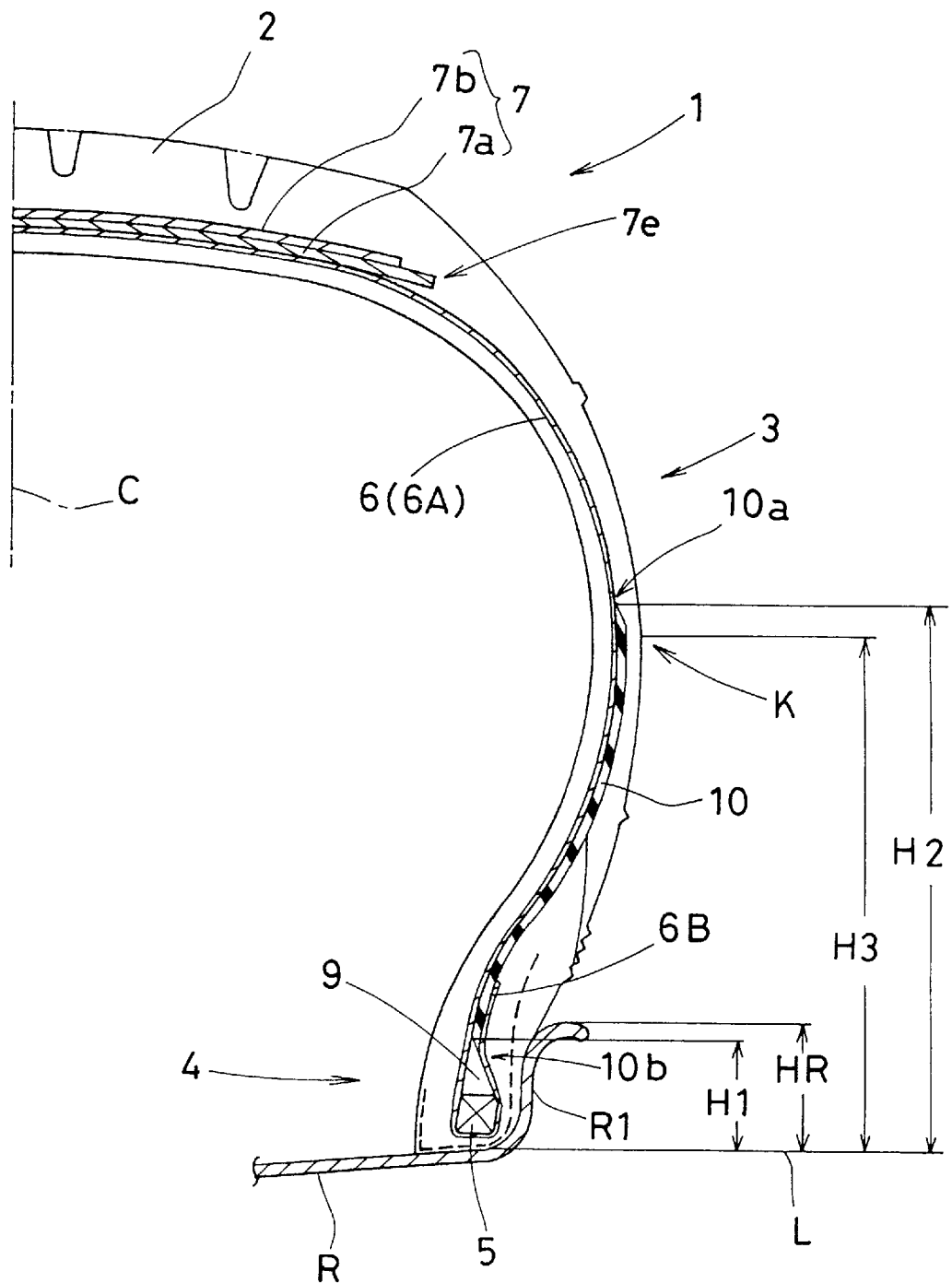
FIG. 1 is a cross sectional view of a tire according to the present invention.

In the figures, pneumatic tires 1 according to the present invention is a radial tire for passenger cars.

The tire 1 comprises a tread portion 2, a pair of sidewall portions 3, a pair of bead portions 4 with a bead core 5 therein, a carcass 6 extending between the bead portions 4, and a belt 7 disposed radially outside the carcass 6 in the tread portion 2.

The carcass 6 comprises at least one ply of cords arranged radially at an angle of 70 to 90 degrees with respect to the tire equator C and extending between the bead portions 4 through the tread portion 2 and sidewall portions 3 and turned up around the bead cores 5 from the axially inside to outside of the tire to form a pair of turnup portions 6B and a main portion 6A. For the carcass cords, organic fiber cords, e.g. polyester, nylon, aromatic polyamide and the like are suitably used. The carcass in this example is composed of a single ply of cords arranged at substantially 90 degrees with respect to the tire equator C.

The belt 7 usually comprises two cross breaker plies 7a and 7b of parallel cords laid at an angle of 10 to 30 degrees with respect to the tire equator C. For the belt cords, steel cords and organic fiber cords, e.g. aromatic polyamide, nylon, polyester and the like can be used. In this embodiment, the belt is composed of two plies of steel cords.

Each bead portion 4 is provided between the turnup portion 6B and main portion 6A of the carcass 6 with a rubber bead filler.

The bead filler extends continuously radially outwardly from the bead core 5 beyond the maximum section width point K of the tire. The bead filler comprises a radially inner part tapering radially outwardly from the radially outside of the bead core 5 and a radially outer part having a substantially constant thickness T. The radially inner part is made of a bead apex rubber 9, and the radially outer part is made of a strip of hard rubber 10 being separate from the bead apex rubber 9.

The bead apex rubber 9 is a hard rubber having a JIS-A hardness of 75 to 95 degrees and the sectional shape thereof is substantially triangular. The radially outer extreme end thereof is positioned at a height H1 in the range of less than the height HR of the radially outer end of the flange R1 of a standard rim R, each height measured from the bead base line L.

Here, the standard rim is the "standard rim" specified in JATMA, the "Measuring Rim" in ETRTO, the "Design Rim" in TRA or the like.

The hard rubber 10 of the radially outer constant-thickness part has a JIS-A hardness of 75 to 95 degrees.

The hardness of the rubber 10 differs from that of the rubber 9. But it may be possible that these are the same hardness.

In this example, the radially inner and outer parts 9 and 10 are made of different rubber compounds, but it is also possible that these parts are the same compound.

The radially inner end of the hard rubber strip 10 is spliced with the radially outer end of the bead apex rubber 9.

The changing point from the tapering part to the constant-width part is positioned radially inward of the radially outer end of the flange R1 of the standard rim R.

The radially outer constant-thickness part 10 extends along the axially outer surface of the carcass main portion 6A beyond the maximum section width point K and preferably has a substantially constant thickness T in the range of from 0.3 to 2.0 mm except for the edge 10a, 10b.

In this embodiment, the radially outer constant-thickness part 10 has a radially outer end 10a. The end 10a may be positioned near the maximum section width point K as shown in FIG. 1, or in the middle between the maximum section width point K and the belt edge 7e as shown in FIG. 3, or between the belt 7 and the carcass 6 as shown in FIG. 4.

Further, as shown in FIG. 5 as another embodiment, it is possible to form the radially outer constant-thickness part 10 as having no radial outer end. That is, the constant-thickness part 10 extends continuously from one of the bead portions 4 to the other.

If the hardness of the radially outer constant-thickness part 10 is less than 75 degrees, it is difficult to improve the steering stability. If more than 95 degrees, the ride comfort is greatly deteriorated.

If the thickness T is more than 2.0 mm, the ride comfort deteriorates and the tire weight unfavorably increases. If less than 0.3 mm, the lateral stiffness of the tire is low and the steering stability is greatly decreased.

Figure 2:
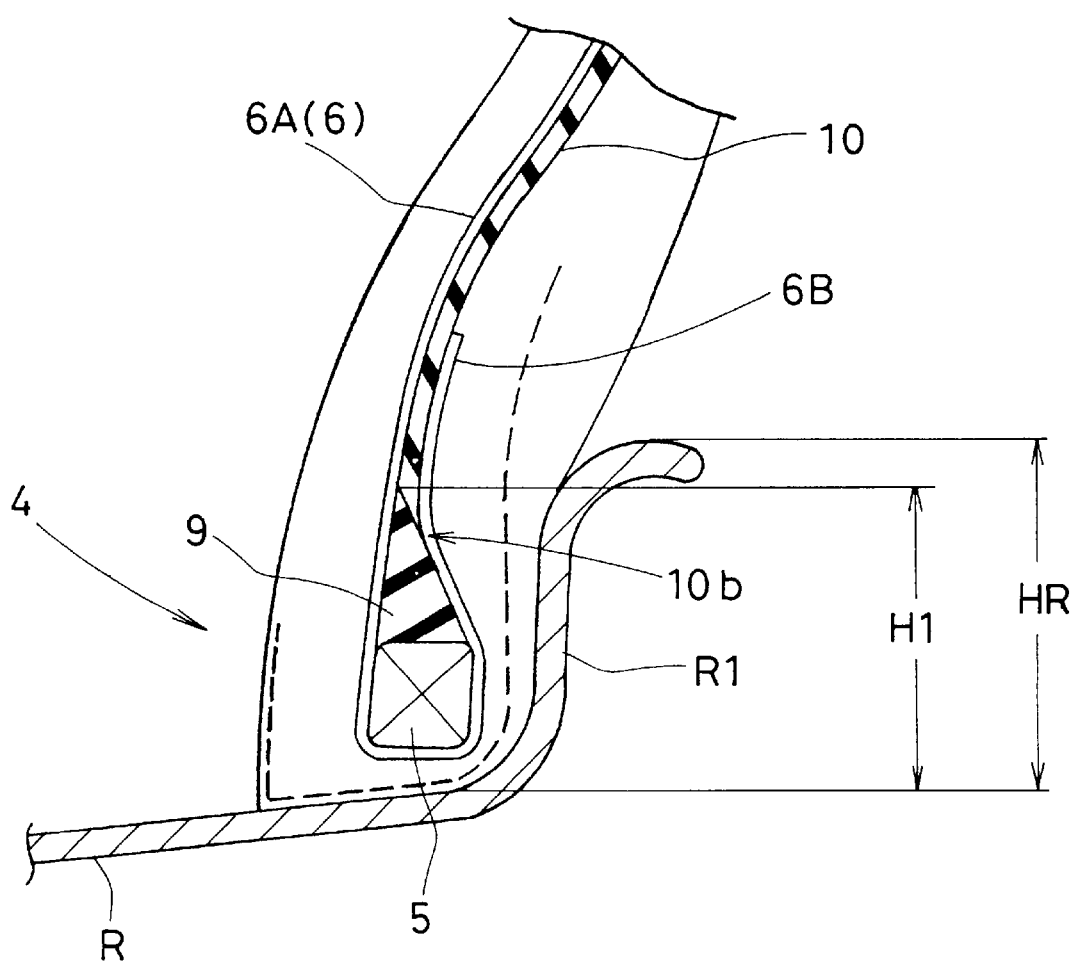
FIG. 2 is an enlarged cross sectional view of the bead portion thereof.
Figure 8A:
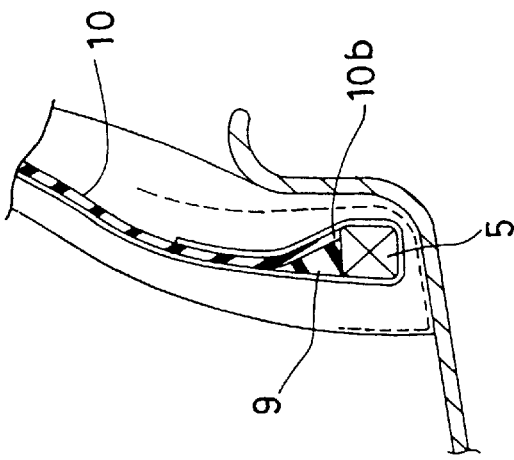
FIGS. 8(A) to 8(C) are cross sectional views showing modifications of the bead filler.
Figure 8B:
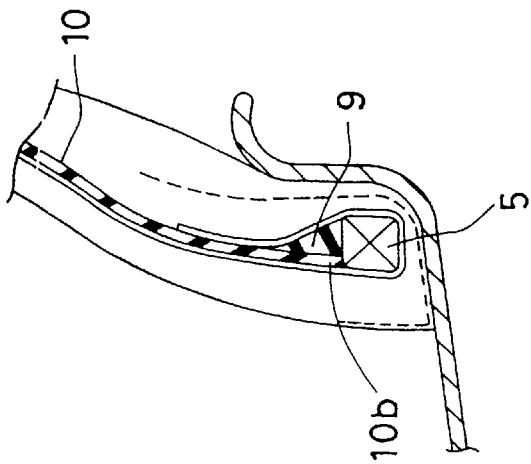
Figure 8C:
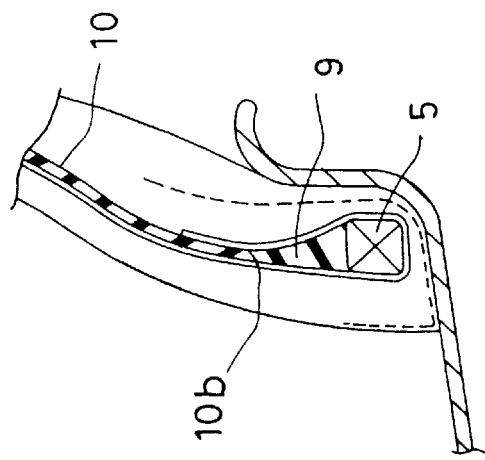
Figure 10:
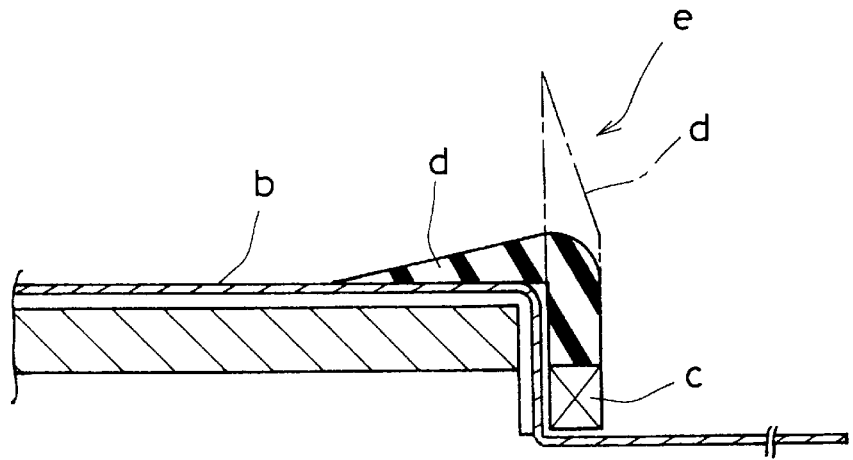
FIG. 10 is a schematic cross sectional for explaining a problem in making the tire having the conventional bead filler.

In this embodiment, the radially inner edge 10b of the rubber strip 10 is disposed on the axially outside of the radially outer end portion of the bead apex 9 as shown in FIG. 2. But it is also possible to dispose the edge 10b on the axially inside of the radially outer end portion of the bead apex 9 as shown in FIG. 8(A). Further, the rubber strip 10 can be extended to the bead core 5 or the vicinity thereof as shown in FIGS. 8(B) and 8(C).

Figure 7A:
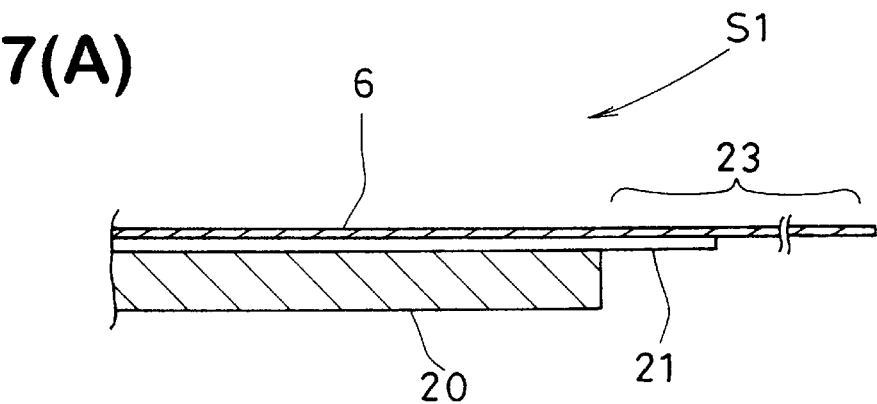
FIGS. 7(A) to 7(C) are schematic cross sectional views for explaining a method of manufacturing the tire according to the present invention.
Figure 7B:
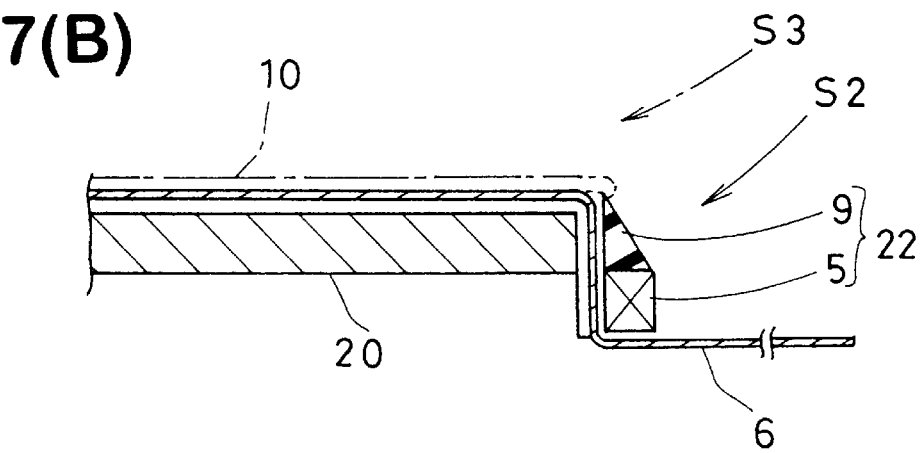
Figure 7C:
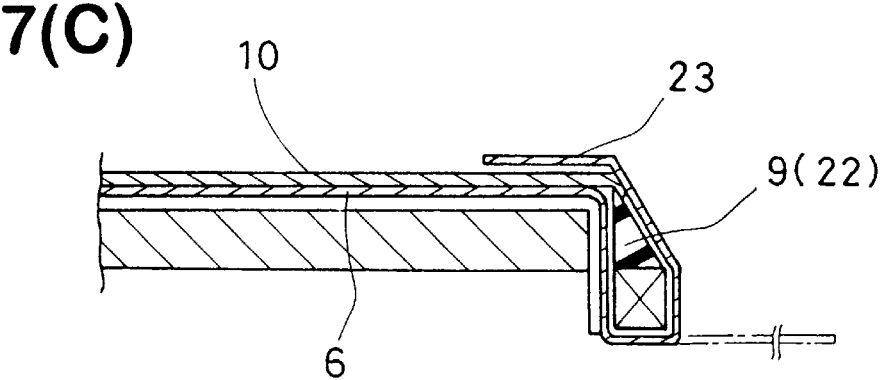

FIGS. 7(A) to 7(C) shown part of the steps of a method of manufacturing the above-mentioned pneumatic tire 1. For example, the method comprises the steps of applying an inner liner rubber 21 on a cylindrical outer face of a tire building drum 20, winding a carcass ply 6 around the cylindrical outer face of the tire building drum 20 so that the edges of the carcass ply 6 protrude from the edges of the cylindrical outer face, decreasing the diameter of the protruding portions 23 of the wound carcass ply 6 relatively to the diameter of the main portion other than the protruding portions 23, setting a bead core 5 and a bead apex rubber 9 around each of the protruding portions 23, wherein the bead apex rubber 9 is fixed around the radially outside of the bead core 5 in advance as an annular assembly 22, and the bead apex rubber 9 has such a height that the radially outer end thereof is positioned at the substantially same radial height as the edge of the cylindrical outer face of the tire building drum 20 or lower, winding a strip of hard rubber 10 around the carcass ply 6 so that the axially outer edge of the wound strip 10 contacts with the bead apex 9, turning up the protruding portions 23 around the bead core 5 so as to wrap the assembly 22, expanding the carcass into a troidal shape, applying sidewall rubber on both sides of the carcass, setting a tread ring radially outside the carcass, and vulcanizing the green tire in a mold.

Incidentally, in respect of the order of the step of setting the assembly 22 and the step of winding the hard rubber strip 10, these steps are interchangeable with each other according to the relative position of the hard rubber strip edge 10b to the bead apex. For example, in case of FIG. 2 or FIG. 8(C), the assembly setting step may be carried out first. In case of FIG. 8(A) or FIG. 8(B), the strip winding step may be first.

Comparison Test

Test tires of size 155SR13 having specifications shown in Table 1 were made and tested for steering stability, ride comfort and production efficiency.

A) Steering stability test and Ride comfort test

A test car provided with test tires was run in a dry test course and the ride comfort and steering stability were evaluated into ten ranks by the test driver's feelings, wherein the higher the rank, the better the performance.

Wheel rim: 4.5×13 standard rim

Inner pressure: 2.0 kgf/sq.cm

Test car: 1000 cc FF passenger car

B) Production efficiency test

The time required for making the tire in a certain production line was measured. In the table, the reciprocals are indicated by an index based on Ref.1 being 100. Thus, the larger the value, the better the production efficiency.

TABLE 1

| | Test Tire No. | | | | | | | |
| --- | --- | --- | --- | --- | --- | --- | --- | --- |
| | 1 | 2 | 3 | 4 | 5 | 6 | 7 | 8 |
| | Structure | | | | | | | |
| | FIG. 1 | FIG. 1 | FIG. 1 | FIG. 3 | FIG. 3 | FIG. 3 | FIG. 4 | FIG. 4 |
| Constant-thickness part | | | | | | | | |
| JIS-A hardness (deg.) | 75 | 85 | 95 | 75 | 85 | 95 | 75 | 85 |
| Thickness (mm) | 1 | 1 | 1 | 1 | 1 | 1 | 1 | 1 |
| Taper part JIS-A hardness (deg.) | 90 | 90 | 90 | 90 | 90 | 90 | 90 | 90 |

TABLE 1-continued

Test results

| | | | | | | | | |
|---|---|---|---|---|---|---|---|---|
| Steering stability | 4 | 5 | 6 | 4 | 5 | 6 | 5 | 6 |
| Ride comfort | 6 | 5 | 5 | 5 | 5 | 4 | 5 | 5 |
| Production efficiency | 120 | 120 | 120 | 120 | 120 | 120 | 120 | 120 |

Figure 9:
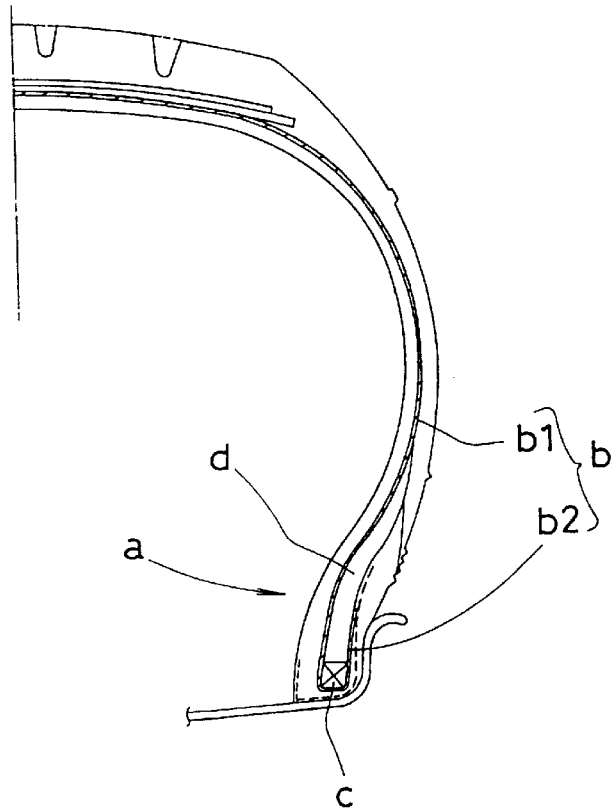
FIG. 9 is a cross sectional view of a test tire having a conventional bead filler.

| | Test Tire No. | | | | | | | |
|---|---|---|---|---|---|---|---|---|
| | 9 | 10 | 11 | 12 | 13 | 14 | 15 | 16 |
| Structure | FIG. 4 | FIG. 5 | FIG. 5 | FIG. 5 | FIG. 6 | FIG. 6 | FIG. 6 | FIG. 9 |
| Constant-thickness part | | | | | | | | |
| JIS-A hardness (deg.) | 95 | 75 | 85 | 95 | 75 | 85 | 95 | — |
| Thickness (mm) | 1 | 1 | 1 | 1 | 1 | 1 | 1 | — |
| Taper part JIS-A hardness (deg.) | 90 | 90 | 90 | 90 | 90 | 90 | 90 | 90 |
| Test results | | | | | | | | |
| Steering stability | 7 | 5 | 6 | 7 | 5 | 6 | 6 | 5 |
| Ride comfort | 4 | 5 | 5 | 4 | 4 | 4 | 3 | 5 |
| Production efficiency | 120 | 120 | 120 | 120 | 100 | 100 | 100 | 100 |

I claim:

1. A pneumatic tire comprising:

a carcass ply extending between bead portions through a tread portion and sidewall portions and turned up around a bead core in each said bead portion to form a pair of turnup portions and a main portion therebetween, and a rubber bead filler disposed between the turnup portion and main portion of the carcass ply in each said bead portion, said rubber bead filler continuously extending radially outwardly from the bead core beyond the maximum section width point of the tire, said rubber bead filler comprising a radially inner part tapering radially outwardly from the bead core and a radially outer part having a substantially constant thickness, and said radially outer part having a JIS-A hardness of 75 to 95 degrees wherein the radially inner tapering part is made of a bead apex rubber, and the radially outer substantially-constant-thickness part is made of a strip of hard rubber spliced with the bead apex rubber, and the height of the radially outer end of the bead apex rubber is lower than the height of the radially outer end of a flange of a standard rim on which the tire is to be mounted, each height measured from the bead base line.

2. The pneumatic tire according to claim 1, wherein said rubber bead filler has a radially outer end positioned between the maximum section width point and an axial edge of a tread reinforcing belt disposed in the tread portion.

3. The pneumatic tire according to claim 1, wherein said rubber bead filler has a radially outer end positioned beneath a tread reinforcing belt disposed in the tread portion.

4. The pneumatic tire according to claim 1, wherein the radially outer substantially-constant-thickness part extends continuously from one bead portion to the other whereby the rubber bead filler does not have a radially outer end.

5. A method of manufacturing a pneumatic tire, the pneumatic tire comprising:

a carcass ply extending between bead portions through a tread portion and sidewall portions and turned up around a bead core in each said bead portion to form a pair of turnup portions and a main portion therebetween, and a rubber bead filler disposed between the turnup portion and the main portion of the carcass ply in each said bead portion, said rubber bead filler continuously extending radially outwardly from the bead core beyond the maximum section width point of the tire, said rubber bead filler comprising a radially inner part tapering radially outwardly from the bead core and a radially outer part having a substantially constant thickness, and said radially outer part having a JIS-A hardness of 75 to 95 degrees, wherein the radially inner tapering part is made of a bead apex rubber, and the radially outer substantially-constant-thickness part is made of a strip of hard rubber spliced with the bead apex rubber, and the height of the radially outer end of the bead apex rubber is lower than the height of the radially outer end of a flange of a standard rim on which the tire is to he mounted, each height measured from the bead base line;

the method comprising the steps of:

winding said carcass ply around a cylindrical face of a tire building drum so that the edges of the carcass ply protrude from the edges of the cylindrical face, decreasing the diameter of the protruding portions of the wound carcass ply relative to the portion other than the protruding portions, setting one said bead core around each of the protruding portions and said bead apex rubber on the radial outside of the bead core, the bead apex rubber having said radially outer end placed at the substantially same radial position as that of the edge of the cylindrical face of the tire building drum or radially inward thereof, winding said strip of hard rubber around the portion of the carcass ply other than the protruding portions so as to contact with the bead apex rubber, and turning up the protruding portions of the carcass ply around the bead cores.

* * * * *